United States Patent Office 3,526,665
Patented Sept. 1, 1970

3,526,665
BENZOBENZAZULENES
Albert J. Frey, Essex Fells, and Eugene E. Galantay, Morristown, N.J., assignors to Sandoz-Wander, Inc., Hanover, N.J., a corporation of Delaware
No Drawing. Original application Dec. 30, 1966, Ser. No. 606,007. Divided and this application Feb. 7, 1968, Ser. No. 724,654
Int. Cl. C07c 49/80, 49/82
U.S. Cl. 260—590      7 Claims

ABSTRACT OF THE DISCLOSURE

The title compounds are 2-amino-1,2,6,7-tetrahydro-(11bH)-benzo-[j]benz[c,d]azulenes and are useful as antihypertensives and useful as sedative-tranquilizers. The title compounds are prepared from suitable 10,11-dihydro-5H-dibenzo[a,d]cyclohepten - 5 - ones or suitable 1,2 - diphenylethanes, e.g., by conversion thereof to the corresponding 1,2,6,7-tetrahydro - (11bH) - benzo[j]benz[c,d] azulen-2-one which is then converted to the corresponding title compound.

---

This is a division of copending application Serial No. 606,007, filed Dec. 30, 1966, now abandoned, which in turn is a continuation-in-part of copending application Ser. No. 516,781, filed Dec. 27, 1965, which in turn is a continuation-in-part of copending application Ser. No. 378,931, filed June 29, 1964; each of the three aforementioned applications now being abandoned.

The present invention is directed to pharmaceutically acceptable and therapeutically useful 2-amino-1,2,6,7-tetrahydro-(11bH) - benzo[j]benz[c,d]azulenes, particularly compounds of the formula

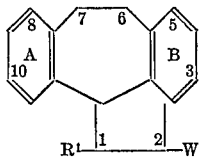

wherein
$R^1$ is either a hydrogen atom (—H) or lower alkyl, e.g. methyl, ethyl, propyl, isopropyl and butyl;
W represents

piperidino; morpholino; N-lower alkylpiperazino or N-(β-hydroxyethyl)piperazino;
$R^2$ and $R^3$, independently, represent hydrogen; lower alkyl, preferably containing from 1 to 4 carbon atoms, e.g., methyl, ethyl, propyl and butyl; allyl, methallyl, propargyl; benzyl of the formula

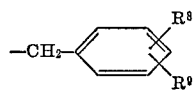

phenethyl or the formula

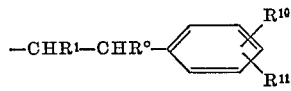

hydroxyalkyl of the formula —$CHR_1$—$CH_2OH$; τ-di (lower)alkylamino(lower)alkyl; or 3 - [N-β-hydroxyethyl)piperazino]propyl.

$R^8$ and $R^9$, independently, represent hydrogen, halo, e.g., chloro or bromo; lower alkoxy, preferably containing from 1 to 4 carbon atoms, e.g., methoxy, ethoxy, propoxy and butoxy; or together form a 2,3- or 3,4-methylenedioxy bridge;
$R^°$ represents hydrogen of lower alkyl, preferably containing from 1 to 4 carbon atoms, e.g., methyl, ethyl, propyl and butyl;
$R^{10}$ and $R^{11}$, independently, represent hydrogen; halo, e.g., chloro and bromo; or lower alkoxy, preferably containing from 1 to 4 carbon atoms, e.g., methoxy, ethoxy, propoxy and butoxy;
ring A is either unsubstituted or substituted in at least one of the positions 8, 9 and 10 with at least one substituent, such as lower alkoxy, e.g. methoxy, ethoxy, propoxy, isopropoxy and butoxy; hydroxy (—OH); a halogen atom, e.g. chlorine (—Cl) and fluorine (—F); and trifluoromethyl (—$CF_3$); and
ring B is either unsubstituted or substituted in at least one of the positions 3, 4 and 5 with at least one substituent, such as lower alkoxy, e.g., methoxy, ethoxy, propoxy, isopropoxy and butoxy; hydroxy (—OH); a halogen atom, e.g. chlorine (—Cl) and fluorine (—F); and trifluoro-methyl (—$CF_3$);

pharmaceutically acceptable acid addition salts thereof and intermediates in the preparation thereof.

As representative of the substituent W, there may be mentioned amino, alkylamino, e.g.; isopropylamino, dialkylamina, e.g. dimethylamino, diethylamino and N-methyl-N-propylamino, β-hydroxyethylamino, di - (β-hydroxyethyl)amino, benzylamino, N-lower alkyl-N-benzylamino, e.g., N-methyl-N-benzylamino, N-lower alkyl-N-(p-halobenzyl)amino, e.g., N-methyl-N-(p-chlorobenzyl) amino, N-lower alkyl-N-(p-lower alkoxybenzyl) amino, e.g., N-methyl-N-(p - methoxybenzyl)amino, N - lower alkyl - N - (3,4 - methylenedioxybenzyl)amino, e.g., N-methyl-N-(3,4-methylenedioxybenzyl)amino, N - allyl-N-benzylamino, phenethylamino, N - lower alkyl - N - phenethylamino, e.g., N-propyl-N-phenethylamino, N - methallyl-N-phenethylamino, N - propargyl - N - phenethylamino, p-halophenethylamino, e.g., p - chlorophenethylamino, p-lower alkoxyphenethylamino, e.g., p-methoxyphenethylamino and N-methylpiperazino.

In view of the fact that compounds (I), in all cases where $R^1$ is different from hydrogen, have at least three asymmetric carbon atoms, there are at least eight stereoisomeric forms of each compound (I). In cases where $R^1$ is hydrogen, there are at least 2 asymmetric carbon atoms, and, thus, at least four stereoisomeric forms of each compound (I). In view of the fact that compounds (I), as well as some of the intermediates leading to them, contain a number (n) of asymmetric carbon atoms, there are $2^n$ stereoisomeric forms of each such compound. All of these stereoisomeric forms are within the scope of the invention, even though some of the stereoisomeric pairs are preferentially formed in the reactions described under "Examples." As desired, single stereoisomers of the products (I) or those of the intermediates can be isolated by methods known to the art-skilled. Thus, the so-called geometrical isomers of diastereoisomers can be separated from each other by, e.g. fractional crystallization, whereas single "racemates" can be split into the optical enantiomers by the process known as "resolution." It is understood that stereoisomeric forms of the same compound (I) may have quantitatively or qualitatively different physiological action.

Among the pharmaceutically acceptable acid addition salts are salts of organic acids, e.g. tartaric acid; inorganic acids, e.g. hydrochloric acid; monobasic acids, e.g. hydrobromic acid and an alkanesulfonic acid, such as methane sulfonic acid ($H_3C$—$SO_3H$); dibasic acids, e.g. sulfuric acid and succinic acid; tribasic acids, e.g. phosphoric acid and citric acid; saturated acids, e.g. acetic acid; ethylenically unsaturated acids, e.g. maleic acid and fumaric acid; and aromatic acids, e.g. salicylic acid and arylsulfonic acids, such as benzenesulfonic acid. The only limitation on the acid selected is that the resulting acid addition salt be pharmaceutically acceptable. The acid does not nullify the therapeutic properties of compounds (I). An acid addition salt is prepared from its corresponding free base in a manner well-known to the art-skilled.

Compounds (I) and their pharmaceutically acceptable acid addition salts are useful as analgesics, antiinflammatories, cardiovascular (anti-hypertensives and/or vasodilators) agents, CNS active (stimulants, sedative-tranquilizers) compounds and peripheral vasodilators. They may be administered either orally or parenterally in standard dosage forms, e.g. tablets and capsules. The average daily dosage varies, but is ordinarily within the range from 30 milligrams to 300 milligrams.

Each of the pharmaceutically active compounds of this invention may be, e.g., incorporated, for oral administration, in a tablet as the sole active ingredient. A typical tablet is constituted by from 1 to 3 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and Q.s. 100 percent of filler, e.g. lactose; all percentages being by weight. Tablets are prepared according to standard tabletting techniques, which are well-known in the art, employing the necessary amounts of conventional granulating liquids, e.g. alcohol SD–30 and purified water. An exemplary tabletting formulation for the instant active compounds is:

|  | Parts |
|---|---|
| Title compound of Example 9 | 55 |
| Tragacanth | 2 |
| Lactose | 34.5 |
| Corn starch | 5 |
| Talcum | 3 |
| Magnesium stearate | 0.5 |
| Alcohol SD–30 }  Q.s. Purified water } |  |

Starting material II, for the preparations of compounds (I) bearing no ring substituents and the corresponding intermediates, is 10,11 - dihydro - 5H - dibenzo[a,d]cyclohepten - 5 - one, which is known. Corresponding ring-substituted starting materials are prepared according to standard procedures well-known to the art-skilled. The substituents are unaffected by the reactions leading from the starting material II to the final product I.

The relationship between starting materials II, intermediates and final products I is reflected in the following flow sheet wherein the compounds are designated by Roman numerals and the reactions by capital letters. In the flow sheet each of $R^6$ and $R^7$ is, independently, either a hydrogen atom (—H) or lower alkyl, e.g. methyl, ethyl, isopropyl and butyl.

Reaction A is a condensation of II with tertiary-butyl acetate in the presence of diethylamino magnesium bromide, following the general method of K. Sisido, H. Nozaki and O. Kurihara, JACS, 74, 6354 (1952), in diethylether, tetrahydrofuran or dioxane as solvent.

Reaction B is the Reformatsky reaction with

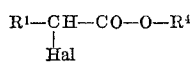

wherein $R^1$ is either a hydrogen atom (—H); or lower alkyl, e.g. methyl, ethyl, propyl, isopropyl and butyl;

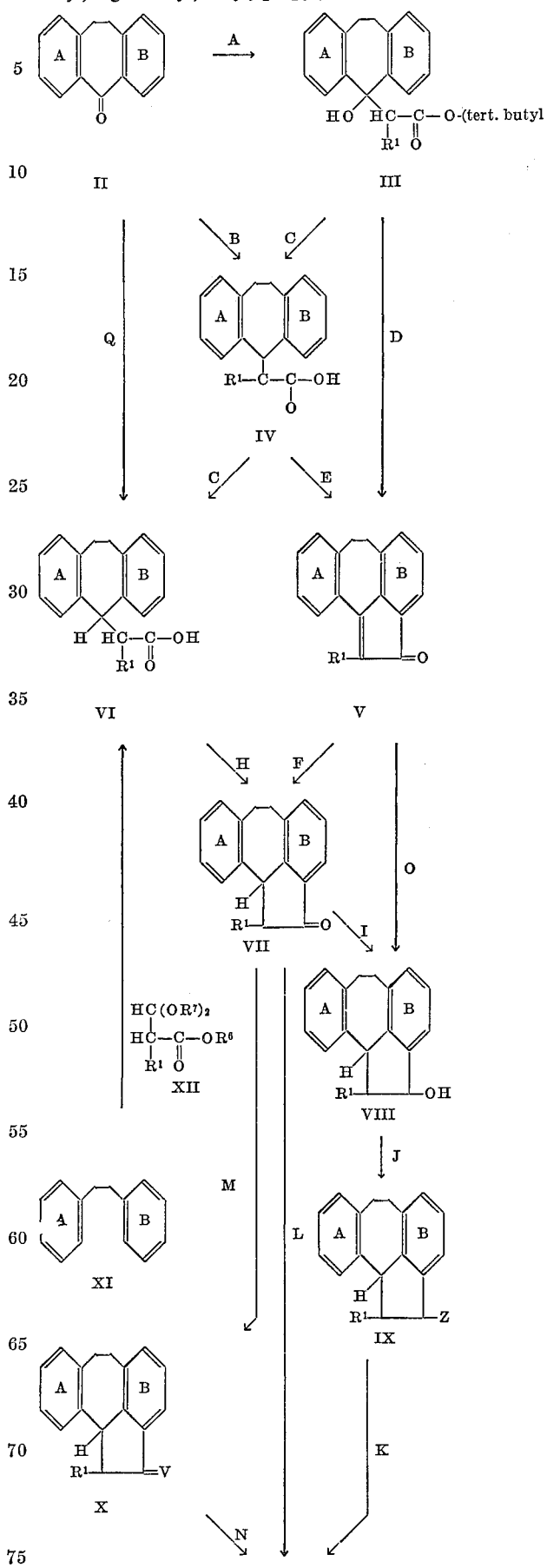

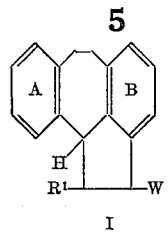

I $R^4$ is lower alkyl, e.g. methyl, ethyl, propyl, isopropyl and butyl; and

Hal is preferably a bromine atom (—Br), but may be either a chlorine atom (—Cl) or an iodine atom (—I);

followed by saponification and dehydration.

Reaction B is alternatively effected with a (lower) alkoxyacetylene [e.g. ethoxyacetylene], followed by rearrangement and saponification of the initial product

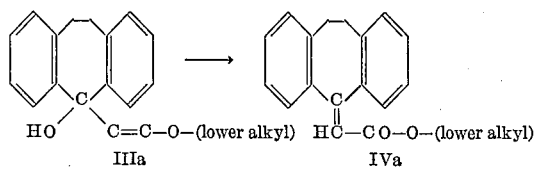

according to the general method described by G.F. "Advances in Organic Chemistry," volume II, pages 157 to 161, Interscience Publishers, Inc., New York, N.Y., 1960.

Reaction C takes place in an inert solvent, such as benzene, toluene and xylene, at the boiling point of the reaction system in the presence of an acid catalyst, preferably para-toluenesulfonic acid, and advantageously in apparatus which permits azeotropic removal of water formed during the reaction.

Reactions D and E (cyclization) are best effected with a mixture of polyphosphoric acid and acetic acid, preferably with a 1:10 mixture, i.e. one part of volume of polyphosphoric acid with an 82% to 84% $P_2O_5$ content dissolved in ten parts by volume of glacial acetic acid, but mixtures with ratios from 1:1000 to 1:3 are useful for this purpose. At least one half mole of $P_2O_5$ for each mole of IV and 1.0 mole of $P_2O_5$ for each mole of III are advantageously employed. Reactions D and E are carried out at from 50° to 150° C., preferably in the range of from 100° to 120° C.

When other cyclization reagents are employed in reactions D and E, side products may be formed to a greater extent and/or the desired product may undergo further reactions, e.g. dimerication and condensation.

Reactions F and G are chemical reductions or standard hydrogenations (preferred) at pressures from 1 to 500 atmospheres and temperatures from 0° to 150° C. in a solvent, such as dioxane, ethanol and ethyl acetate, preferably with palladium catalyst.

Reaction H (cyclization) is carried out preferably with polyphosphoric acid at a temperature from 40° to 200° C., but other methods, e.g. cyclization in liquid anhydrous hydrofluoric acid or Friedel-Crafts cyclization of the corresponding chloride, may also be used.

Reaction I is a reduction according to standard procedures. While reduction with sodium borohydride is preferred, other complex hydrides, such as lithium aluminum hydride, or other reduction methods, such as the Meerwein-Ponndorf reduction or catalytic hydrogenation, may alternatively be employed.

In compounds IX, Z is either a chlorine atom (—Cl), i.e. reaction J is with thionyl chloride; a bromine atom (—Br), i.e. reaction J is with hydrogen bromide in benzene; an iodine atom (—I), i.e. reaction J is with hydriodic acid; mesyloxy (—$OSO_2CH_3$), i.e. reaction J is with mesyl chloride; or tosyloxy (—$OSO_2C_6H_4CH_3$), i.e. reaction J is with tosyl chloride. The reaction with hydrogen bromide in benzene at a temperature from 4° to 30° C. is preferred.

Reaction K is wth an amine, W—H, wherein W has its above-ascribed meaning. Depending upon the nature of the amine, i.e. whether it is a primary or secondary amine, its volatility, its solubility, etc., different methods (e.g. methods A, B and C or Examples 9, 10 and 11, respectively) are employed in effecting this reaction. Thus, when the amine is volatile, e.g. dimethylamine, it is advantageous to employ a pressure in excess of one atmosphere and more than two moles of amine per mole of IX. When the amine is primary (either $R^2$ or $R^3$ is a hydrogen atom), an excess thereof is used to minimize side products. Reaction temperatures, pressures and solvents depend, to some extent, on the nature of the amine, but temperatures from 20° to 200° C. pressures from 0.2 to 100 atmospheres and inert solvents, such as dioxane and benzene, are operative.

After the completion of the reaction it is often advantageous to admix with the reaction product one mole of strong inorganic base, e.g. sodium hydroxide, to liberate the free base of said reaction product and/or the starting amine from its salt with the acid, Z—H.

Separation and recovery of the unreacted starting amine is effected by distillation, vacuum- or steam-distillation or extraction with water of a, e.g., benzene solution of the reaction product. After elimination of the unreacted starting amine, W—H, the product is advantageously isolated and purified by the preparation and recrystallization of its pharmaceutically acceptable acid addition salts, e.g. hydrochloride, fumarate, methane sulfonate and salicylate, themselves objects of this invention.

Reaction L is a hydrogenation (preferably catalytic) in the presence of an amine, W—H. The hydrogenation is preferably effected with Raney nickel as the catalyst at a pressure from 1 to 500 atmospheres, at a temperature from 20° to 200° C. and in a solvent, such as ethanol and dioxane.

Reaction M is a condensation of VII with a compound, $H_2V$, wherein

V is either =N—$R^5$, =N—OH or =N—O—(lower alkyl); and $R^5$ is either lower alkyl, e.g. methyl, ethyl, propyl, isopropyl and butyl; or (lower)alkyl, e.g. benzyl and β-phenethyl; or (lower)alkylamino(lower)alkyl, e.g. dimethylaminoethyl and methylaminopropyl.

When the compound is $H_2NR^5$, the condensation is best carried out by heating VII with the primary amino $H_2NR^5$, preferably in admixture with an acid catalyst (e.g. para-toluenesulfonic acid and zinc chloride) in an inert solvent such as benzene, toluene and ortho-dichlorobenzene, at a temperature from 50° to 200° C. and, preferably, in an apparatus which permits simultaneous removal of water formed during the reaction. When the compound is either $H_2N$—OH or $H_2N$—O—(lower alkyl), condensation is effected by heating VII with said compound (or acid addition salts, e.g. hydrochloride and acetate, thereof) in a solvent, such as ethanol and pyridine, at a temperature from 30° to 200° C.

Reaction N is a reduction of X to I. It is either a chemical reduction with, e.g., a complex hydride, such as lithium aluminum hydride and sodium borohydride; sodium amalgam; and zinc; or a catalytic hydrogenation.

Reaction O is either a chemical reduction with a complex hydride (as exemplified for reaction N) or it is a catalytic hydrogenation.

Reaction P, preferred for the preparation of intermediates VI with activating substituents in at least one of the rings A and B, is the acid-catalyzed condensation of a β,β-dialkoxypropionic acid ester XII with a 1,2-diphenylethane derivative XI, followed by saponification.

Reaction Q, preferred with some ring-substituted starting materials II, leads to intermediates VI, and consists of (a) reducing II to the corresponding alcohol XIII and/or symmetrical ether XIV, preferably with a complex hydride, e.g. sodium borohydride and lithium aluminum hydride, (b) converting the above-obtained alcohol XIII and/or ether XIV into the corresponding halide XV, e.g. chloride, by reaction with a reagent like hydrogen chloride in benzene and thionyl chloride, (c) reacting the thus-obtained halide XV with a malonic ester derivative, e.g. diethylethoxymagnesium malonate, to yield the diethylester XVI; (d) saponifying and thermally decarboxylating the ester, yielding VI.

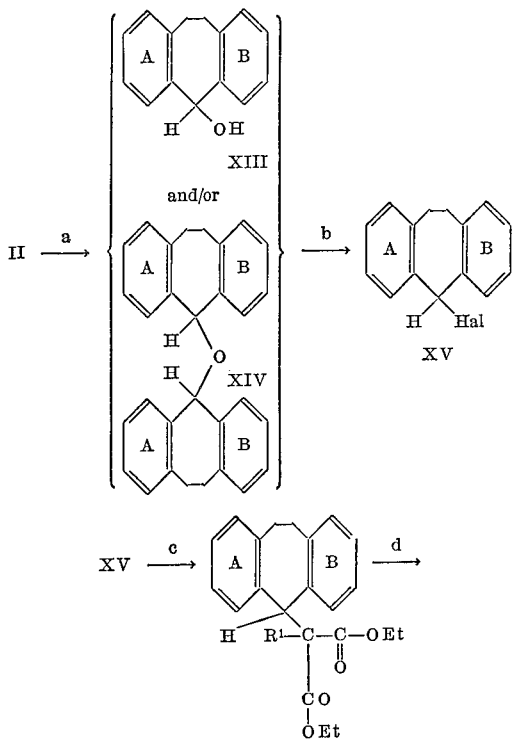

It is also possible to prepare Compound I wherein W is —NH₂ and alkylate (or reductively alkylate) to obtain corresponding compounds wherein R₂ and R₃ are other than hydrogen atoms (See Method F.)

When, in the above series of reactions, starting compounds II having a non-symmetric substitution pattern on rings A and B, i.e. starting materials II devoid of a twofold symmetry axis, are used, reactions B and C can (and, in most cases do) lead to two geometric (cis and trans) isomers of intermediate IV, which can be separated by, e.g., fractional crystallization. Both geometrical isomers IV can be used to effect the ring closure of reaction E. For a single geometric isomer IV, ring closure is effected toward that benzene ring (A or B) which is closer in space to the carboxylic group. Thus, a cis-trans pair IV will give rise, in reaction E, to two chemical (substitution) isomers V. Similarly, any compound III derived from a non-symmetrically substituted starting compound II can lead, in reaction D, to two chemical (substitution) isomers V. These are separated by usual methods, e.g. by fractional recrystallization, and used in the subsequent steps leading to final products I.

If, however, starting material II with a non-symmetric substitution pattern on rings A and B is to be used, it is often preferred to proceed via steps A, C, G, H or B, G, H or by the sequence Q, H to intermediates VII. In such cases separation of the cis- and trans-isomers of IV is avoided since, from reactions G and Q, only one compound VI is formed. The preferential direction of the ring closure H is dependent on the relative activation, by substituents on rings A and B, toward such ring closure. Of the indicated possible substituents, halogen atoms and trifluoromethyl groups are ring-closure deactivating substituents; whereas, lower alkoxy groups are ring-closure activating substituents.

When cyclization H is employed, the ring closure is toward that ring which is less deactivated (more activated) when the substitution is asymmetric. It is possible, however, to obtain ring closure with respect to the more deactivated ring when reactions E and F are employed. In either case, it is preferable that one of the two benzene rings with which cyclization occurs contains at most one ring-closure deactivating substituent; whereas, the other may contain such substituents in any number of the available positions.

The following examples are merely illustrative. Reactions wherein the benzene nuclei are either unsubstituted or are specifically substituted are illustrative of corresponding reactions wherein said nuclei are any of those within the scope contemplated by this invention, unless otherwise indicated.

In each of the examples the parts and percentages are by weight unless otherwise specified. The temperatures are in degrees centigrade. The relationship between parts by weight and parts by volume is the same as that between the kilogram and the liter.

EXAMPLE 1

5-carboxymethylidene-10,11-dihydro-5H-dibenzo(a,d)cycloheptene

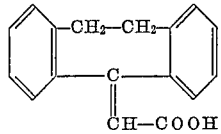

Reflux a solution of 401 parts of 5-hydroxy-5-(carbo-tert.-butoxymethyl)-10,11 - dihydro - 5N - dibenzo[a,d] cycloheptene [J. Org. Chem., 27, 230 (1962)] and 5 parts of p-toluenesulfonic acid in 1000 parts by volume of toluene under a water separation trap. After the theoretical amount (22.3 parts by volume) of water collects (12 hours), concentrate the solution to a thick crystal slurry and filter off 309 parts of the title product, melting point (M.P.) 167° to 170°. The pure compound melts at 173°.

EXAMPLE 2

5-carboxymethyl-10,11-dihydro-5H-dibenzo(a,d)cycloheptene

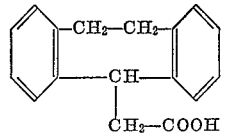

Shake a suspension of 10.0 parts of 5-carboxymethylidene-10,11-dihydro-5H-dibenzo[a,d]cycloheptene in 100 parts of dioxane with 0.85 part of palladium-charcoal (10%) catalyst at 50° to 55° in a hydrogen atmosphere of 50 atmospheres until one mole of hydrogen is taken up. Filter the resultant mixture and extract the catalyst with boiling chloroform. Evaporate the filtrate and extract to obtain 10.0 parts of 5-carboxymethyl-10,11-dihydro-5H-dibenzo[a,d]cycloheptene, melting point (M.P.) 161°.

EXAMPLE 3

6,7-dihydro-2H[j]benz[c,d]azulen-2-one

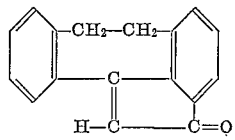

Admix 40 parts of 5-carboxymethylidene-10,11-dihydro-5H-dibenzo[a,d]cycloheptene with 60 parts of polyphosphoric acid in 600 parts of glacial acetic acid and reflux the resulting solution for 18 hours. Pour the reaction mixture onto ice, and dissolve the resulting orange precipitate in chloroform. Wash the obtained chloroform solution with 2N sodium hydroxide solution to separate any unreacted 5-carboxymethylidene-10,11-dihydro-5H-dibenzo[a,d]cycloheptene; then evaporate the remaining chloroform solution to obtain 31 parts of the crude 6,7 - dihydro - 2H-benzo(j)benz[c,d]azulen-2-one. Purify by chromatography on silica gel to separate the compound of this example from 5-methylidene-10,11-dihydro-5H-dibenzo[a,d]-cycloheptene, M.P. 56° to 58° The pure product is an orange solid, M.P. 66° to 67°

EXAMPLE 4

1,2,6,7-tetrahydro-(11bH)-benzo(j)benz[c,d]-azulen-2-one

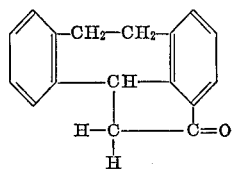

Shake a solution of 17.0 parts of crude 6,7-dihydro-2H-benzo(j)-benz[c,d]azulen-2-one in 250 parts of 1,2-dimethoxyethane with 2.0 parts of palladium-charcoal (5%) cathalyst in a hydrogen atmosphere of 50 pounds per square inch (p.s.i.g.) unit the hydrogen consumption ceases. Filter the resultant mixture and extract the catalyst with boiling chloroform. Evaporate the filtrate and extracts. Isolate 7.4 parts of 1,2,6,7-tetrahydro-(11bH)-benzo[j]benz[c,d]azulen-2-one from the residue by crystallization from hot dimethyl formamide, M.P. 217° to 218°. Isolate 3.0 parts of 1,2,6,7-tetrahydro-(11bH)-benzo[j]benz[c,d]azulen-2-ol as side product.

EXAMPLE 5

1,2,6,7-tetrahydro-(11bH)-benzo[j]benz-[c,d]azulen-2-one

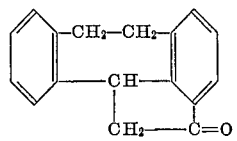

To 1600 parts of commercial polyphosphoric acid ($P_2O_5$ content of 82% to 84%) vigorously stirred at 92° add, in one portion, 160 parts of 5-carboxymethyl-10,11-dihydro-5H-dibenzo[a,d]cycloheptene and maintain stirring between 90° and 93° for three hours. Pour the produced mixture onto 5000 parts of ice, filter and wash separated solids and 2N sodium carbonate solution to remove unchanged starting material. Rewash said solids with water, ethanol and diethylether. Recrystallize the thus-washed solids from 800 parts of boiling dimethylformamide to obtain about 90 parts of the pure title compound, M.P. 218°. Recover unchanged starting material from soda and aqueous washings by acidification.

EXAMPLE 6

1,2,6,7-tetrahydro-(11bH)-benzo[j]benz-[c,d]azulen-2-ol

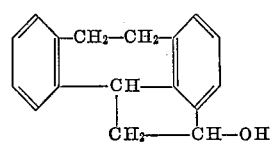

(a) Reflux for 3 hours a mixture consisting of 6.75 parts of 1,2,6,7-tetrahydro - (11bH) - benzo[j]benz[c,d]-azulen-2-one, 1 part of lithium aluminum hydride and 200 parts of dry diethyl ether. Decompose the excess lithium aluminum hydride with dilute sulfuric acid under cooling. Distill off ether and obtain 6.75 parts of 1,2,6,7-tetrahydro (11bH)-benzo[j]benz[c,d]azulen-2-ol, M.P. 161° to 163°, by filtration and recrystallization from ethanol/diethylether or benzene.

(b) Reflux a mixture of 100 parts of 6,7-dihydro-(2H)-benzo[j]benz[c,d]azulen-2-one, 16 parts of sodium borohydride and 200 parts per volume of ethanol for two hours. After cooling, decompose the excess borohydride with dilute hydrochloric acid and add a total of 1000 parts by volume of water thereto to precipitate 96.5 parts of the title compound, M.P. 162° to 164°.

EXAMPLE 7

2-bromo-1,2,6,7-tetrahydro-(11bH)-benzo-[j]benz[c,d]azulene

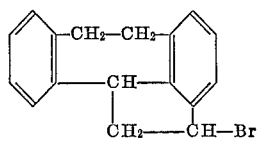

Introduce hydrogen bromide gas for two hours into a suspension of 6.2 parts of 1,2,6,7-tetrahydro(11bH)-benzol[j]benz[c,d]azulen-2-ol in 150 parts of benzene. Wash the thus obtained solution with ice-cold water and sodium hydrocarbonate solution and evaporate the neutral, dry benzene solution to obtain 8.1 parts of crude 2 - bromo-1,2,6,7-tetrahydro - (11bH)-benzo[j]benz[c,d]-azulene. Wash solids with cold diethyl ether to obtain the title compound, M.P. 119° to 121°.

EXAMPLE 8

1-methyl-2-N-piperidino-1,2,6,7-tetrahydro-(11bH)-ben[j]benz[c,d]azulene

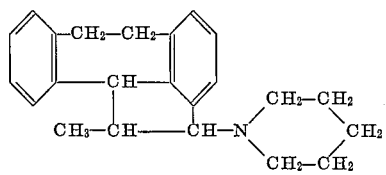

Shake a mixture of 60 parts of 1-methyl-1,2,6,7-tetrahydro-(11bH)-benzo[j]benz[c,d]azulen-2-one, 100 parts of piperidine, 80 parts of methanol and 20 parts of Raney nickel catalyst in a hydrogen atmosphere of 1470 p.s.i.g. and maintain the reaction temperature at 140° until hydrogen consumption ceases. Filter the reaction mixture, evaporate the filtrate to dryness and introduce hydrogen chloride into the etheral solution of the residue to obtain the hydrochloride of the tile compound.

Replacing the 1-methyl - 1,2,6,7 - tetrahydro-(11bH)-benzo[j]benz[c,d]-azulen-2-one with an equivalent of either 8-chloro-3,10-dimethoxy-1-methyl-1,2,6,7 - tetrahydro - (11bH)-benzo[j]benz[c,d]azulen-2-one, 4-ethoxy-1-methyl-9 - trifluoromethyl-1,2,6,7 - tetrahydro - (11bH)-benzo[j]-benz[c,d]azulen-2-one or 10-fluoro-5-methoxy-1-methyl-1,2,6,7 - tetrahydro-(11bH) - benzo[j]benz[c,d]-azulen-2-one results in the preparation, in similar manner, of the corresponding compound I.

EXAMPLE 9—METHOD A 2-dimethylamino-1,2,6,7-tetrahydro-(11bH)-benzo[j]benz[c,d]azulene

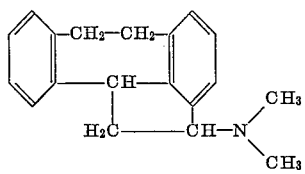

With 175 parts of a saturated (0°) solution of dimethylamine in dry dioxane, admix 20.5 parts of 2-bromo-1,2,6,7-tetrahydro - (11bH) - benzo[j]benz[c,d]azulene, and shake obtained mixture in a pressure apparatus (Parr) for three hours at 55°. Thereafter, add to the resultant a solution of 2.8 parts of sodium hydroxide in ethanol, evaporate the solvents, dissolve the resulting residue in dry diethylether, filter and add the filtrate to a solution of excess fumaric acid in diethylether. There is thus obtained the acid fumarate (M.P. 270° to 273°) of the title compound. The free base, M.P. 101° to 103°, is obtained from the acid addition salt according to standard procedures for freeing a base from its acid addition salt.

The fumarate of compound I (prepared in similar manner from corresponding starting materials) wherein rings A and B are unsubstituted, $R^1$ is a hydrogen atom and W is diethylamino, has a melting point of from 183° to 184°. The hydrochloride of compound I (prepared in similar manner from corresponding starting materials) wherein rings A and B are unsubstituted, $R^1$ is a hydrogen and W is tertiary butylamino, has a melting point of from 251° to 252°.

EXAMPLE 10—METHOD B

2-N-methyl-N'-piperazino-1,2,6,7-tetrahydro-(11bH)-benzo[j]benz[c,d]azulene

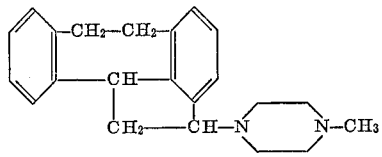

Admix a solution of 12 parts of 2-bromo-1,2,6,7-tetrahydro-(11bH)-benzo[j]benz[c,d]azulene in 175 parts by volume of benzene with 32 parts of N-methylpiperazine. After resulting exothermic period reflux the product for an additional three hours. Cool the obtained material, add thereto a solution of 1.6 parts of sodium hydroxide in 40 parts by volume of ethanol and evaporate the resultant to dryness.

Heat the residue to 50° in a high vacuum to remove any retained N-methylpiperazine. Dissolve the remainder in dry diethylether, and filter the organic layer from the sodium bromide present. Introduce hydrogen chloride into the separated (ether) organic layer to obtain 15.7 parts of the dihydrochloride, M.P. 264° to 268°, of the title compound.

Replacing the N-methylpiperazine with an equivalent of N-β-hydroxy-ethylpiperazine results in the preparation, in similar manner, of the corresponding compound I (M.P. of dihydrochloride 264° to 268°). Likewise, the same replacement with an equivalent of morpholine results in a hydrochloride, M.P. 243° to 246°; the same replacement with an equivalent of di(β-hydroxyethyl) amine results in a hydrochloride, M.P. 165° to 167°; and the same replacement with an equivalent of N-β-hydroxyethyl-N'-γ-aminopropylpiperazine results in a trihydrochloride, M.P. 255°.

EXAMPLE 11—METHOD C 2-(β-phenylethylamino)-1,2,6,7-tetrahydro-(11bH)-benzo[j]benz[c,d]azulene

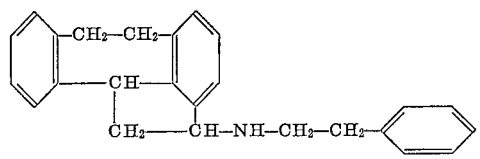

To a solution of 6.0 parts of 2-bromo-1,2,6,7-tetrahydro-(11bH)-benzo[j]benz[c,d]azulene in 100 parts by volume of benzene add 200 parts of β-phenethylamine, and reflux the resulting admixture for 12 hours.

Cool the obtained product, add thereto a solution of 1.2 parts of potassium hydroxide in 16 parts by volume of water and steam-distill the resultant until the distillate is neutral. Extract the residue with diethylether and dry the ether extract over sodium sulfate. Introduce hydrogen chloride into the dry ether solution to obtain 6.0 parts of the hydrochloride, M.P. 255°, of the title compound.

Replacing the β-phenethylamine with an equivalent of each of the following compounds, W-H, results in the preparation, in similar manner, of the corresponding compound I, the hydrochloride of which has the indicated melting point:

| W—H | Hydrochloride, M.P., ° |
|---|---|
| α-Methyl-β-phenethylamine | 276 |
| N-methyl-N-p-chlorobenzylamine | 263 |
| N-methyl-N-p-methoxybenzylamine | 220 |
| N-methyl-N-3,4-methylenedioxybenzylamine | 234 |
| N-allyl-N-benzylamine | 215 |
| p-Chlorophenethylamine | 259 |
| p-Methoxyphenethylamine | 235 |
| 3,4-dimethoxyphenethylamine | 220 |
| N-methyl-N-β-phenylisopropylamine | 178 |
| N-β-phenethyl-N-propylamine | 208 |
| N-methallyl-N-phenethylamine | 198 |
| N-phenethyl-N-propargylamine | 203 |

EXAMPLE 12—METHOD D 2-(L-1'-hydroxy-2'-butylamino)-1,2,6,7-tetrahydro-(11bH)-benzo[j]benz[c,d]azulene

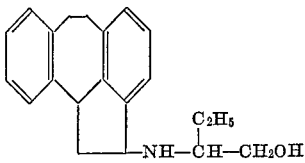

Reflux a mixture of 5.86 parts of 1,2,6,7-tetrahydro-(11bH)-benzo[j]benz[c,d]azulen - 2 - one, 2.23 parts of L(+)-2-aminobutanol, 0.002 part of paratoluenesulfonic acid and 23 parts by volume of toluene under a water-separation trap until 0.40 part of water is collected. Evaporate the residual mixture to dryness, and dissolve the residue (8.6 parts of a red oil) in 25 parts by volume of dioxane. To the dioxane solution add a solution of 1.1 parts of sodium borohydride in 25 parts by volume of dry ethanol.

After 4 hours at room temperature (20°) evaporate the resulting clear solution to dryness, dissolve the residue in diethylether, water wash the obtained ether solution, dry the washed solution over sodium sulfate and add to the dried product a solution of hydrogen chloride in isopropyl alcohol to precipitate 6.6 parts of the hydrochloride, M.P. 205° to 209°, of the title compound.

EXAMPE 13—METHOD E 2-amino-1,2,6,7-tetrahydro-(11bH)-benzo[j]benz[c,d]azulene

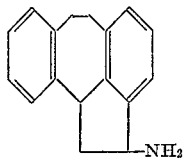

Reflux a mixture of 14.0 parts of 1,2,6,7-tetrahydro-(11bH)-benzo[j]benz[c,d]azulen-2-one, 10 parts of hydroxylamine hydrochloride and 25 parts of sodium acetate trihydrate in 850 parts by volume of ethanol for two hours. Dilute the refluxed material with water, and separate from the resultant a quantitative yield of the oxime, M.P. 182° to 185°, of the starting azulenone.

Add 10.0 parts of the oxime to a solution of 1 part by volume of acetic acid in 500 parts by volume of ethanol. To the product add, partionwise, 500 parts of 3% sodium amalgam. During the latter additions maintain the obtained medium slightly acidic by the addition thereto of glacial acetic acid.

After all of the amalgam is added (four or five hours), decant supernatant from the mercury, acidify the supernatant with concentrated hydrochloric acid, evaporate the alcohol from the acidified supernatant and adjust the pH of the remaining aqueous solution to 12 with sodium hydroxide. Extract the product with chloroform to obtain 7.5 parts of crude title compound. Dissolve the thus-extracted crude material in dry diethylether, introduce hydrogen chloride gas into the obtained ether solution to precipitate the hydrochloride of the title compound. After repeated recrystallization from ethanol/diethylether, the melting point of the hydrochloride of the predominant diastereoisomer of the title compound is 274° to 277°.

EXAMPLE 14—METHOD F 2-dimethylamino-1,2,6,7-tetrahydro-(11bH)benzo[j] benz[c,d]azulene hydrochloride

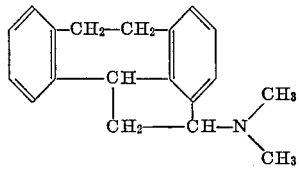

Heat a mixture of 3 parts of 2-amino-1,2,6,7-tetrahydro-(11bH)-benzo[j]benz[c,d]azulene, 2 parts of formic acid and 3 parts of 40% formaldehyde solution under reflux until carbon dioxide evolution ceases. Add an excess of potassium hydroxide solution and extract the resultant product with diethylether. Dissolve the ether extracts in dilute hydrochloric acid and add thereto an excess of sodium nitrite to destroy any primary or secondary amine. Wash the aqueous solution with diethylether; then add a large excess of potassium hydroxide and extract the resultant product with diethylether. Dry the ether solution and introduce hydrochloric acid gas to obtain the white solid 2-dimethylamino-1,2,6,7-tetrahydro-(11bH)-benzo[j]benz[c,d]azulene hydrochloride.

EXAMPLE 15

2,3-dimethoxy-5-chloro-10,11-dihydro-5H-dizenzo[a,d] cycloheptene

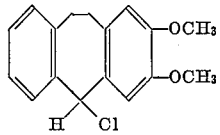

Reflux a mixture of 250 parts of 2,3-dimethoxy-10,11-dihydro-5N-dibenzo[a,d]cyclohepten-5-one, 39 parts of sodium borohydride and 2500 parts by volume of ethanol for 2 hours. Pour refluxed material onto a mixture of 500 parts by volume of 2 N hydrochloric acid and 1500 parts by volume of 2 N hydrochloric acid and 1500 parts of ice. Filter off solids; dissolve filtered solids in 100 parts by volume of benzene. Wash and dry the resulting benzene solution, which now contains a mixture of the 5-hydroxy compound and the corresponding asymmetric ether.

Cool above-obtained benzene solution to 5° to 10°, and introduce hydrogen chloride into same. Add enough chloroform thereto to dissolve separating solids. After one hour, add thereto 150 parts of anhydrous calcium chloride, filter and evaporate filtrate, to yield the crude title compound, M.P. 110° to 117°, dec. The pure product, obtainable by recrystallization from diethylether-petroleum ether, melts at 125° to 128°, dec.

EXAMPLE 16

2,3-dimethoxy-5-carboxymethyl-10-11-dihydro-5H-dibenzo[a,d]cycloheptene

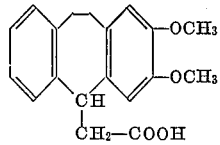

Prepare diethyl ethoxymagnesium melonate from 41.3 parts of magnesium turnings and 275 parts of diethyl malonate by any literature procedure and eliminate any excess ethanol used in this procedure by adding and stripping off dioxane. Add thereto 500 parts by volume of dry tetrahydrofurane and, under stirring, the solution of 498 parts of crude 2,3-dimethoxy-5-chloro-10,11-dihydro-5N-dibenzo[a,d]cycloheptene in 2000 parts by volume of tetrahydrofurane. Reflux for 3 hours, strip off most of the solvent and pour residue over a mixture of 2000 parts of ice and 1000 parts by volume of 2 N hydrochloric acid. Filter and wash solids, which are the crude malonic ester derivative.

For saponification, reflux a mixture containing 627 parts of the above derivative, 368 parts of potassium hydroxide, 885 parts by volume of water and 3000 parts by volume of ethanol. After 16 hours, concentrate the mixture to remove alcohol, filter from separating solids (94 parts of unchanged "ether" intermediate which can be reused), wash the basic aqueous solution with diethylether and then acidify with concentrated hydrochloric acid. 484 parts of the malonic acid derivative (M.P. 167° to 170°) separates.

For decarboxylation, heat 482 parts of the malonic acid derivative at 190° for 2 hours; cool and recrystallize residue from methylene chloride/benzene to obtain title product, M.P. 155° to 157°.

EXAMPLE 17

3,4-dimethoxy-1,2,6,7-tetrahydro-(11bH)-benzo[j] benz[c,d]azulen-2-one

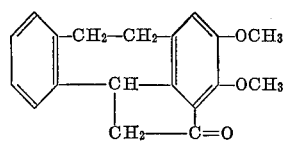

Admix with 1350 parts of polyphosporic acid, preheated to 60°, 66 parts of 2,3-dimethoxy-5-carboxymethyl-10,11-dihydro-5H-dibenzo[a,d]cycloheptene and stir vigorously for 38 minutes at this temperature. Pour on ice, wash benzene solution of separated solids with sodium carbonate solution to recover 16.8 parts of unchanged acid. Evaporate neutral and dry benzene solution to obtain, after recrystallization from benzene, the pure title compound, M.P. 116° to 120°.

EXAMPLE 18

3,4-dimethoxy-1,2,6,7-tetrahydro-(11bH)-benzo[j] benz[c,d]azulen-2-ol

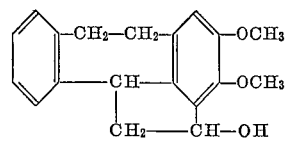

Reflux a mixture of 10.0 parts of 3,4-dimethoxy-1,2,6,7-tetrahydro - (11bH) - benzo[j]benz[c,d]azulen-2-one, 2.0 parts of sodium borohydride and 200 parts by volume of 95% ethanol for 3 hours, pour the resultant thereafter onto 400 parts of ice containing hydrochloric acid. Filter off title compound, M.P. 153° to 156°.

EXAMPLE 19

2-chloro-3,4-dimethoxy-1,2,6,7-tetrahydro-(11bH) benzo[j]benz[c,d]azulene

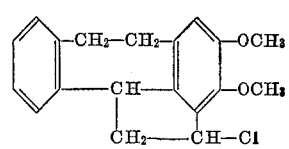

Saturate the solution of 88. parts of 3,4-dimethoxy-1,2,6,7 - tetrahydro - (11bH) - benzo[j]benz[c,d]azulen-2-ol in 200 parts by volume of benzene at 5° with hydrogen chloride. After 30 minutes add calcium chloride thereto, filter and evaporate to obtain title compound, M.P. 138° to 140°.

EXAMPLE 20

2-dimethylamino-3,4-dimethoxy-1,2,6,7-tetrahydro-(11bH)-benzo[j]benz[c,d]-azulene

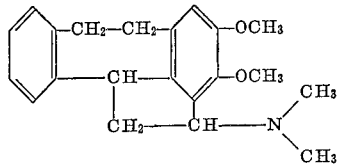

Heat, in pressure equipment at 80° for 12 hours, a solution of 7.8 parts of 2 - chloro-3,4-dimethoxy-1,2,6,7-tetrahydro-(11bH)-benzo[j]benz[c,d]azulene, 10 parts of anhydrous dimethylamine and 200 parts by volume of benzene. Add to the resultant 24.8 parts by volume of 1.0 N aqueous sodium hydroxide solution and evaporate the obtained mixture to dryness. Add 300 parts by volume of dry diethylether, filter and, into the clear etheral solution thus obtained, introduce hydrogen chloride to precipitate the hydrochloride of the title compound which, after recrystallization from alcohol, has a M.P. of 209° to 211° dec. The free base has a melting point of 121° to 123°.

Using an equivalent of N-methylpiperazine in lieu of the dimethylamine, the corresponding 2-N - methyl-N'-piperazinyl compound (M.P. of the dihydrochloride: 165° to 169°, dec.; M.P. of the free base: 152°) is obtained according to the same procedure.

EXAMPLE 21

3-hydroxy-4-methoxy-1,2,6,7-tetrahydro-(11bH)-benzo[j]benz[c,d]azulen-2-one

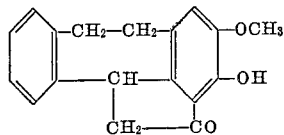

Reflux a mixture of 50 parts of 2,3-dimethoxy-5-carboxymethyl - 10,11 - dihydro-5H - dibenzo[a,d]cycloheptene, 65 parts by volume of thionyl chloride and 150 parts by volume of benzene for 150 minutes and then remove benzene and excess thionyl chloride from the resultant in vacuo.

Add, within 30 mintues, the solution of the thus-obtained crude acid chloride in 500 parts by volume of carbon disulfide to a stirred mixture of 25.6 parts of aluminum chloride and 1000 parts by volume of carbon disulfide, cooled to —5°. Add now another portion of 25.6 parts of aluminum chloride and reflux the mixture for 2 hours. Pour the mixture onto ice (3000 parts) containing 500 parts by volume of 2N hydrochloric acid.

Separate, wash, dry and evaporate the organic layer. Crystallize residue with ethyl acetate to obtain the title compound, M.P. 156°.

EXAMPLE 22

2-amino-3-hydroxy-4-methoxy-1,2,6,7-tetrahydro-(11bH)-benzo[j]benz[c,d]azulene

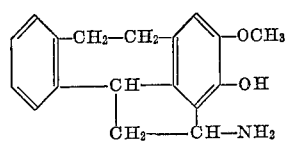

Reflux a mixture of 38 parts of 3-hydroxy-4-methoxy-1,2,6,7-tertahydro-(11bH) - benzo[j]benz[c,d]azulen - 2-one, 100 parts of hydroxylamine acetate and 500 parts by volume of ethanol for 30 minutes. On cooling, solid crystallizes. Recover by filtration the oxime of above azulenone.

Subject above oxime to Raney nickel catalyzed hydrogenation in ethanol solvent saturated with ammonia, at 1000 p.s.i.g. hydrogen pressure and room temperature to obtain the title product.

EXAMPLE 23

2,3,7,8-tetramethoxy - 5-α-carbethoxyethyl-10,11-dihydro-5H-dibenzo-[a,d]cycloheptene

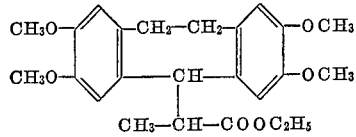

Add dropwise, to a solution of 5 parts of 3,4,3',4'-tetramethoxydibenzyl and 3.5 parts of ethyl β,β-diethoxyisobutyrate in 50 parts by volume of glacial acetic acid, kept at 15°, 30 parts by volume of concentrated sulfuric acid. After 16 hours at 10°, pour resulting mixture onto ice. Extract mixture with chloroform. Obtain title product 134° to 136°, by crystallizing the chloroform extract with 10 parts by volume of methanol.

EXAMPLE 24

2-chloro-5-(1'-carboxyl-1'-ethylidene)-10,11-dihydro-5H-dibenzo[a,d]cycloheptene

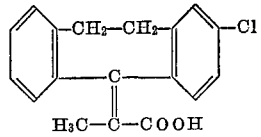

React 50 parts of 2-chloro-10,11-dihydro-5H-dibenzo[a,d]cyclohepten-5-one with 55 parts of ethyl α-bromopropionate under the conditions generally known as the Reformatsky Reaction. Saponify the crude product by refluxing it with alcoholic potassium hydroxide and acidify to obtain crude 2-chloro - 5 - (1'-carboxy-1'-ethylidene)-10,11 - dihydro - 5H - dibenzo[a,d]cycloheptene, which is used without further purification in the following example.

EXAMPLE 25

2-chloro-5-(1'-carboxy-1'-ethyl)-10,11-dihydro-5H-dibenzo[a,d]cycloheptene

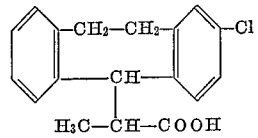

Reflux for 16 hours a mixture of 50 parts of crude 2-chloro - 5 - (1'-carboxy-1'-ethylidene)-10,11-dihydro-5H-dibenzo[a,d]cycloheptene, 20 parts of red phosphorus, and 160 parts of 57% hydriodic acid. Cool, pour the reaction mixture onto ice, filter and wash the insoluble product. Reflux the resultant product with concentrated ammonium hydroxide. Filter the ammonium hydroxide solution and acidify with dilute hydrochloric acid to pH 1. 2-chloro-5-(1'-carboxy-1'-ethyl) - 10,11 - dihydro - 5H-dibenzo[a,d]cycloheptene separates as a solid.

EXAMPLE 26

1-methyl-9-chloro-1,2,6,7-tetrahydro-(11bH)-benzo[j]benz[c,d]azulen-2-one

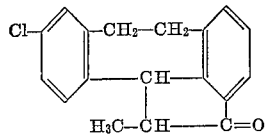

Heat a mixture of 10 parts of 2-chloro-5-(1'-carboxy-1'-ethyl) - 10,11 - dihydro-5H-dibenzo[a,d]cycloheptene and 100 parts of polyphosphoric acid at 95° for 90 minutes. Pour the reaction mixture onto ice and filter to separate the crude 1-methyl-9-chloro - 1,2,6,7 - tetrahydro-(11bH)-

17 benzo[j]benz[c,d]azulen-2-one. Wash the crude product with dilute aqueous sodium hydroxide and water and purify by recrystallization with dimethyl formamide.

EXAMPLE 27

1-methyl-9-chloro-1,2,6,7-tetrahydro-(11bH)-benzo[j]benz[c,d]azulen-2-ol

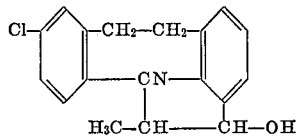

Reflux for 3 hours a mixture consisting of 7 parts of 1-methyl - 9 - chloro-1,2,6,7-tetrahydro-(11bH)-benzo[j] benz[c,d]azulen-2-one, 1 part of lithium aluminum hydride and 200 parts of dry diethylether. Decompose the excess lithium aluminum hydride with dilute sulfuric acid under cooling. Wash, dry and evaporate the ether layer to obtain 1-methyl-9-chloro - 1,2,6,7 - tetrahydro-(11bH)-benzo[j]benz[c,d]azulen-2-ol.

EXAMPLE 28

1-methyl-2-bromo-9-chloro-1,2,6,7-tetrahydro-(11bH)-benzo[j]benz[c,d]azulene

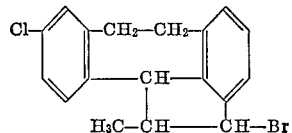

Introduce for 2 hours hydrogen bromide gas into a suspension of 6.5 parts of 1-methyl-9-chloro-1,2,6,7-tetrahydro-(11bH)-benzo[j]benz[c,d]-azulen-2-ol in 150 parts of benzene. Wash the thus-obtained dark solution with ice-cold water and sodium hydrocarbonate solution and evaporate the neutral, dry benzene solution to obtain the crude 1-methyl-2-bromo - 9 - chloro - 1,2,6,7 - tetrahydro-(11bH)-benzo[j]benz[c,d]azulene. Purify by crystallization with diethylether-petroleum ether.

EXAMPLE 29

1-methyl-2β-diethylaminoethylamino-9-chloro-1,2,6,7-tetrahydro-(11bH)-benzo[j]benz[c,d]azulene

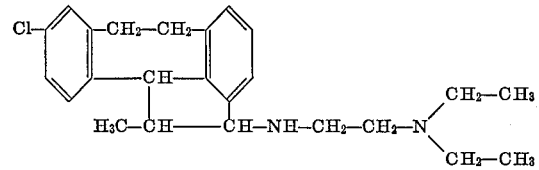

Heat a solution of 1 part of 1-methyl-2-bromo-9-chloro-1,2,6,7-tetrahydro-(11bH)-benzo[j]benz[c,d]azulene and 9 parts of β-diethylaminoethylamine in 20 parts of dioxane at 80° for 12 hours. Add to the product 0.3 part of sodium hydroxide dissolved in 10 parts by volume of ethanol. Evaporate the resultant to dryness and eliminate the volatile components of the mixture in a high vacuum. Dissolve the resultant product in dry diethylether and introduce into the dry ether solution hydrogen chloride gas to obtain 1-methyl-2-β-diethylaminoethylamino-9-chloro - 1,2,6,7 - tetrahydro-(11bH)-benzo[j]benz[c,d] azulene dihydrochloride.

18

Replacing the 1-methyl-2-bromo-9-chloro-1,2,6,7-tetrahydro-(11bH)-benzo[j]benz[c,d]azulene with an equivalent of either 2-bromo-4,9-difluoro-1-methyl-1,2,6,7-tetrahydro - (11bH) - benzo[j]benz[c,d]azulene or 2-bromo-8,10 - dichloro - 1 - methyl-3-trifluoromethyl-1,2,6,7-tetrahydro-(11bH)-benzo[j]benz[c,d]azulene results in the preparation, in a similar manner, of the corresponding compound I.

Various changes may be made in the substituents on the rings of compounds I and in the processes for the preparation of compounds I without departing from either the spirit or the scope of the invention or sacrificing its material advantages. The exemplary compounds merely provide illustrative embodiments.

What is claimed is:

1. A compound of the formula

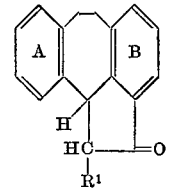

wherein $R^1$ represents hydrogen or lower alkyl;

Ring A is either unsubstituted or substituted in at least one of the positions 8, 9 and 10 with at least one substituent of the group lower alkoxy, hydroxy, halo and trifluoromethyl, provided that no two trifluoromethyl groups are ortho to each other; and Ring B is either unsubstituted or substituted in at least one of the positions 3, 4 and 5 with at least one substituent of the group lower alkoxy, hydroxy, halo and trifluoromethyl, provided that no two trifluoromethyl groups are ortho to each other.

2. A compound of claim 1 wherein $R^1$, Y and X are as defined in claim 1, Ring A is unsubstituted and Ring B is substituted in at least one of the positions 3, 4 and 5 with at least one and no more than two substituents of the group hydroxy and lower alkoxy.

3. A compound of claim 1 wherein $R^1$, Y and X are as defined in claim 1. Ring B is unsubstituted and Ring A is substituted in at least one of the positions 8, 9 and 10 with at least one and no more than two chloro substituents.

4. The compound of claim 1 which is 1,2,6,7-tetrahydro (11bH)-benzo[j]benz[c,d]azulen-2-one.

5. The compound of claim 1 which is 3,4-dimethoxy-1,2,6,7 - tetrahydro(11bH) - benzo[j]benz[c,d]azulen-2-one.

6. The compound of claim 1 which is 3-hydroxy-4-methoxy - 1,2,6,7 - tetrahydro(11bH)-benzo[j]benz[c,d] azulen-2-one.

7. A compound of claim 1 which is 9-chloro-1-methyl-1,2,6,7 - tetrahydro(11bH) - benzo[j]benz[c,d]azulen-2-one.

References Cited

UNITED STATES PATENTS 3,358,027  12/1967  Vanderstelt _____ 260—590

DANIEL D. HORWITZ, Primary Examiner